(12) United States Patent
Abbott et al.

(10) Patent No.: US 9,288,673 B2
(45) Date of Patent: *Mar. 15, 2016

(54) LOCAL MANAGEMENT AND CONTROL OF REMOTELY SUBSCRIBED WIRELESS COMMUNICATION DEVICES

(71) Applicant: EXTENET SYSTEMS, INC., Lisle, IL (US)

(72) Inventors: Eric Abbott, Lisle, IL (US); Eric Lekacz, Lisle, IL (US); Tormod Larsen, Lisle, IL (US)

(73) Assignee: EXTENET SYSTEMS, INC., Lisle, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/645,020

(22) Filed: Mar. 11, 2015

(65) Prior Publication Data

US 2015/0189508 A1 Jul. 2, 2015

Related U.S. Application Data

(63) Continuation of application No. 13/353,654, filed on Jan. 19, 2012.

(51) Int. Cl.
*H04W 4/00* (2009.01)
*H04M 1/66* (2006.01)
(Continued)

(52) U.S. Cl.
CPC .............. *H04W 12/06* (2013.01); *H04W 4/021* (2013.01); *H04W 8/06* (2013.01); *H04W 12/08* (2013.01);
(Continued)

(58) Field of Classification Search
CPC ............................ H04W 12/06; H04W 84/045
USPC ................. 455/411, 435.1, 432.1–432.3, 433
See application file for complete search history.

(56) References Cited

U.S. PATENT DOCUMENTS 7,239,632 B2 7/2007 Kalavade et al.
2005/0245230 A1 11/2005 Benco et al.
(Continued)

FOREIGN PATENT DOCUMENTS

EP 2 209 348 7/2010
EP 2 369 893 9/2011

OTHER PUBLICATIONS

International Searching Authority, International Search Report and Written Opinion mailed Feb. 1, 2013, 10 pages.
(Continued)

*Primary Examiner* — Dung Hong
(74) *Attorney, Agent, or Firm* — McDonnell Boehnen Hulbert & Berghoff LLP

(57) ABSTRACT

A mobility gateway may authenticate a first wireless communication device (WCD) with a first wireless operator. The first WCD may subscribe to the first wireless operator, and may be served by a first wireless coverage area that is defined by a first carrier frequency. The first carrier frequency may be associated with the first wireless operator. The mobility gateway may also authenticate a second WCD with a second wireless operator. The second WCD may subscribe to the second wireless operator, may be served by a second wireless coverage area that is defined by a second carrier frequency. The second carrier frequency may be associated with the second wireless operator. The mobility gateway may route network traffic between a local network point of presence and at least one of the first and second WCD.

21 Claims, 8 Drawing Sheets

(51) Int. Cl.
  *H04W 12/06*   (2009.01)
  *H04W 4/02*   (2009.01)
  *H04W 24/02*   (2009.01)
  *H04W 8/06*   (2009.01)
  *H04W 12/08*   (2009.01)
  *H04W 4/20*   (2009.01)
  *H04W 88/16*   (2009.01)
  *H04W 84/04*   (2009.01)
  *H04W 88/10*   (2009.01)

(52) U.S. Cl.
  CPC .............. *H04W 24/02* (2013.01); *H04W 4/206* (2013.01); *H04W 84/045* (2013.01); *H04W 88/10* (2013.01); *H04W 88/16* (2013.01)

(56) References Cited

U.S. PATENT DOCUMENTS

| | | | |
|---|---|---|---|
| 2007/0117555 A1* | 5/2007 | Gewecke | 455/415 |
| 2007/0265003 A1 | 11/2007 | Kezys et al. | |
| 2008/0013470 A1* | 1/2008 | Kopplin | 370/310 |
| 2008/0057976 A1* | 3/2008 | Rae et al. | 455/456.1 |
| 2008/0081592 A1 | 4/2008 | Das et al. | |
| 2009/0170472 A1 | 7/2009 | Chapin et al. | |
| 2009/0232019 A1* | 9/2009 | Gupta et al. | 370/252 |
| 2009/0265543 A1* | 10/2009 | Khetawat et al. | 713/151 |
| 2010/0023531 A1* | 1/2010 | Brisebois et al. | 707/10 |
| 2010/0080198 A1* | 4/2010 | Li | 370/338 |
| 2010/0080214 A1 | 4/2010 | Li et al. | |
| 2011/0081911 A1 | 4/2011 | Silver | |
| 2011/0255516 A1* | 10/2011 | Pawar et al. | 370/332 |
| 2012/0243478 A1 | 9/2012 | Nielsen et al. | |
| 2013/0072186 A1 | 3/2013 | Picker et al. | |

OTHER PUBLICATIONS

International Searching Authority, International Preliminary Report on Patentability for PCT/US2012/064674 mailed Sep. 18, 2014, 8 pages.

European Search Report for Application No. 12865931.5 mailed Aug. 14, 2015, 6 pages.

Canadian Patent Office, Office Action for CA Application No. 2,861,182, mailed Sep. 4, 2015, 4 pages.

* cited by examiner

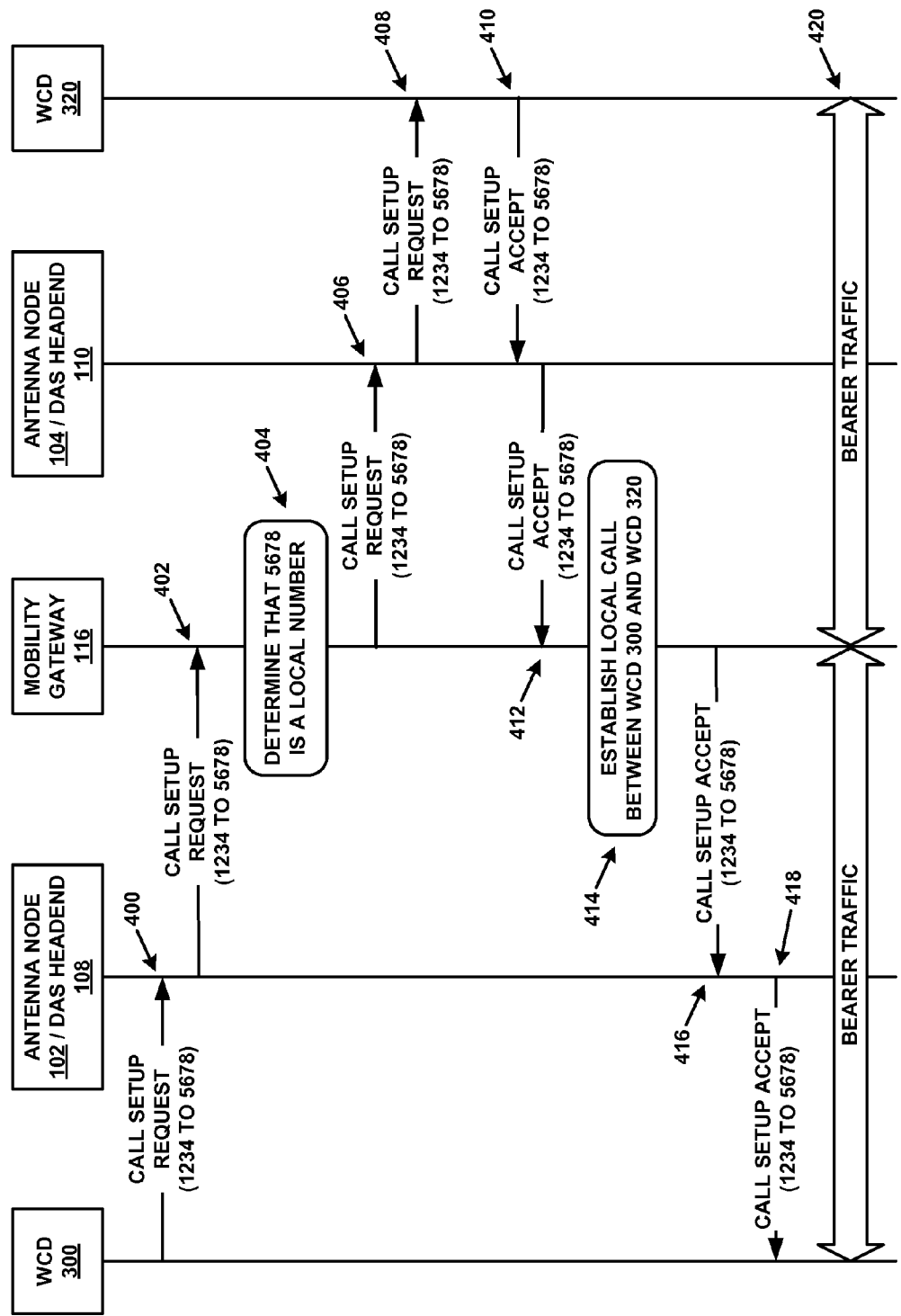

LOCAL MANAGEMENT AND CONTROL OF REMOTELY SUBSCRIBED WIRELESS COMMUNICATION DEVICES

CROSS-REFERENCE TO RELATED APPLICATION

This application claims priority to U.S. patent application Ser. No. 13/353,654, filed Jan. 19, 2012, which is hereby incorporated by reference in its entirety.

BACKGROUND

While the use of wireless networks continues to expand, ubiquitous wireless coverage remains problematic. Particularly, in-building wide-area wireless coverage often suffers attenuation, interference, and/or distortion from structural components of the building. While micro-cellular or pico-cellular equipment can be deployed within the building to improve coverage, different users may subscribe to different wireless operators. However, deploying micro-cellular or pico-cellular equipment throughout the building for each wireless operator may be prohibitively expensive.

SUMMARY

It may be possible to deploy a single instance of in-building wireless equipment throughout a building. The equipment may include one or more antennas that define wireless coverage areas on frequencies owned or licensed by various wireless service providers. Thus, just one set of wireless equipment can support the wireless communication devices (WCDs) of users who subscribe to these different wireless service providers.

In order to provide service to these WCDs, the in-building wireless equipment may include a mobility gateway through which at least some traffic to and from the WCDs may pass. A WCD may transmit provisioning and/or authentication requests via the mobility gateway and on to the WCD's wireless service provider. The wireless service provider may provision and/or authenticate the WCD, and inform the mobility gateway of the result of these operations. The mobility gateway may also perform a second level of local provisioning and/or authentication as well.

Once properly provisioned and authenticated, the WCD may be allowed to communicate with other networks (e.g., the Internet and/or the public switched telephone network (PSTN)) through the building's wireless equipment. The mobility gateway may route traffic to and from the WCD via a local network point of presence, rather than via the WCD's wireless service provider. In this way, congestion on the wireless service provider's network, and any backhaul between the building and the wireless service provider, may be reduced.

Other efficiencies may be possible, such as implementation of a local calling plan so that WCD users within the building can dial each other using, e.g., 4-digit or 5-digit dialing. This feature would eliminate the need for the users to remember or keep track of changes to full phone numbers. Additionally, the bearer traffic of calls between two or more WCDs may be routed directly between these WCDs, possibly without leaving the in-building wireless network. This feature may also reduce congestion on the wireless service providers' networks, and on backhaul link(s) between the building and the wireless service provider.

In full generality, the embodiments herein may apply to more than just in-building wireless networks. For instance, they may also apply to multi-building wireless networks, campus wireless networks, or any other location that might benefit from enhanced wireless coverage. Some examples of the types of locations that may find the embodiments herein advantageous include office buildings, university campuses, central business districts, museums skyscrapers, military bases, warehouses, hospitals, sports facilities, theme parks, airports, train stations, and various corporate settings.

Given that these locations often serve various classes of users, it may also be advantageous to differentiate network traffic of these users based on their respective classes. For example, on a military base, traffic to and from an officer's WCD may be given priority over traffic to and from an enlisted person's WCD. Similarly, in a hospital, traffic to and from a doctor's WCD may be given priority over traffic to and from a visitor's WCD. It may be beneficial if these classes of users would be consistent and/or independent of the wireless service provider and/or device the particular user might be using.

The embodiments herein may also differentiate between users based on their location. For instance, traffic to and from WCDs of users in the premium boxed seats of a sports arena may be given priority over traffic to and from WCDs of users in other locations in the arena. Moreover, some higher-ranked users (e.g., the military officers, doctors, or users in particular locations) may be given access to content that is not available to other, lower-ranked users.

Accordingly, in an example embodiment, at least one antenna node may radiate to define a first wireless coverage area on a first carrier frequency and a second wireless coverage area on a second carrier frequency. The first carrier frequency may be associated with a first wireless operator and the second carrier frequency may be associated with a second wireless operator. The antenna node(s) may be communicatively coupled to a mobility gateway by at least one common backhaul link that carries network traffic between the antenna node(s) and the mobility gateway.

The mobility gateway may be configured to (i) authenticate WCDs served by the first wireless coverage area, (ii) authenticate WCDs served by the second wireless coverage area, and (iii) route network traffic between a network point of presence and at least one authenticated WCD served by the first or second wireless coverage area. The authentication of the WCDs may involve communicating with respective subscriber databases of the first and second wireless operators and/or locally authenticating the WCDs with the mobility gateway.

In another example embodiment, a mobility gateway, which may be in a local network, may receive a first authentication request from a first WCD. The first WCD may be served by a first wireless coverage area that is defined using a first carrier frequency, and the first carrier frequency may be associated with a first wireless operator. Possibly in response to receiving the first authentication request, the mobility gateway may (i) remotely authenticate the first WCD by communicating with a first subscriber database of the first wireless operator, and (ii) locally authenticate the first WCD by determining that a first WCD identifier of the first WCD is present in a local database at the mobility gateway.

The mobility gateway may also receive a second authentication request from a second WCD. The second WCD may be served by a second wireless coverage area that is defined using a second carrier frequency, and the second carrier frequency may be associated with a second wireless operator. Possibly in response to receiving the second authentication request, the mobility gateway may (i) remotely authenticate the second WCD by communicating with a second subscriber database of the second wireless operator, and (ii) locally authenticate the second WCD by determining that a second WCD identifier of the second WCD is present in the local database.

Then, the mobility gateway may route network traffic between a local network point of presence and at least one of the first and second WCD. The local network point of presence may be in the local network.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE FIGURES

FIG. 4 depicts yet another message flow, in accordance with an example embodiment.

DETAILED DESCRIPTION

1. Communication Network Overview

Figure 1:
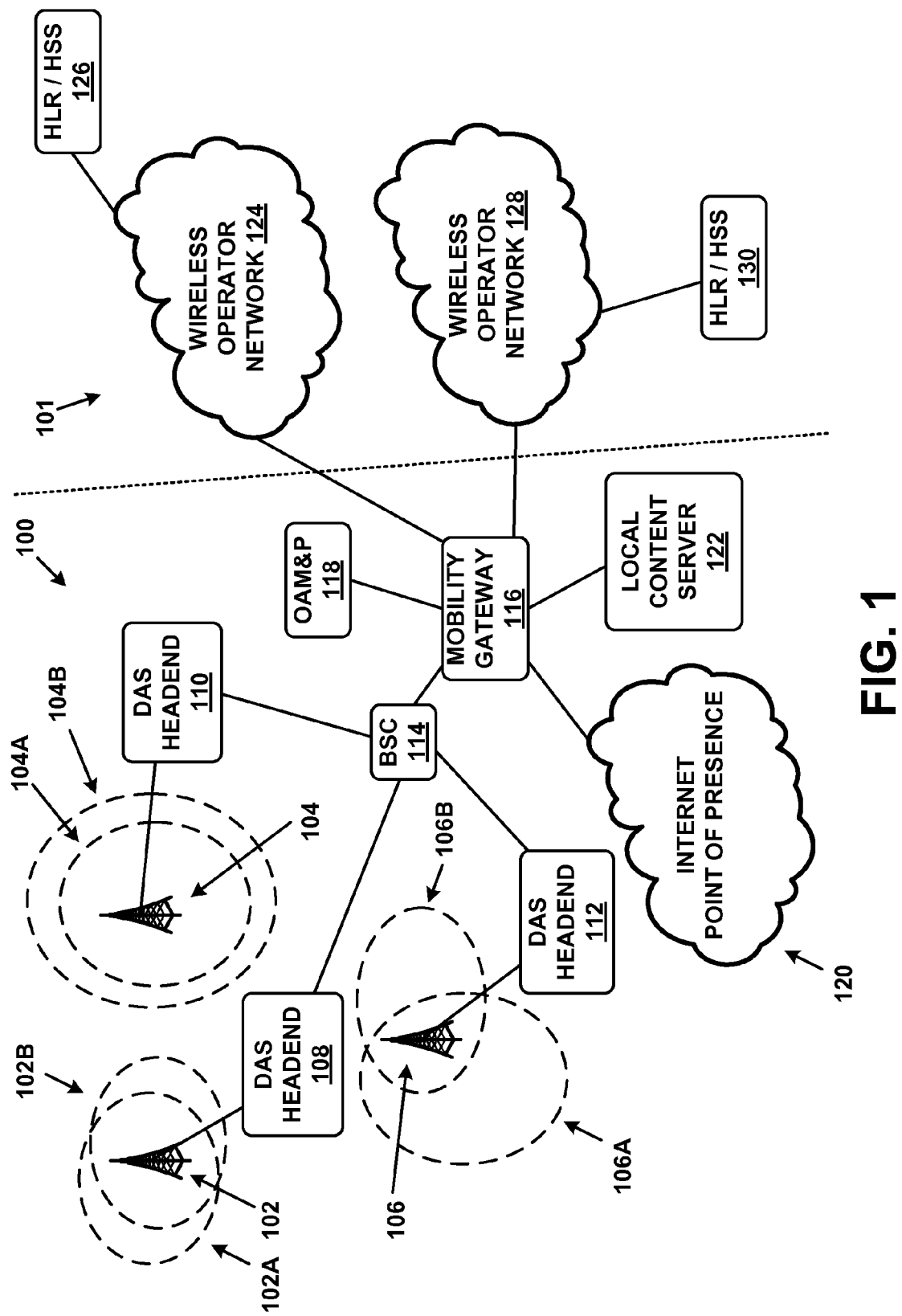
FIG. 1 depicts a communication network, in accordance with an example embodiment.

FIG. 1 is an example communication network in which one or more embodiments may be employed. At a high level, FIG. 1 includes local network 100 and remote network 101. However, in full generality, both local network 100 and remote network 101 may be capable of communicating with one or more additional public or private networks using various circuit-switching and/or packet-switching technologies.

Local network 100 may include one or more in-building or on-campus wireless networks. These networks may use a distributed antenna system (DAS) that subdivides and distributes the radio transmitter/receiver functionality of a "traditional" base transceiver station (BTS) among a DAS headend and a number of smaller, lower-power antenna nodes. The antenna nodes can be deployed so as to provide coverage within underserved structures (e.g., in buildings) or over terrain where deployment of traditional cellular towers is impractical or not permitted.

In a typical DAS architecture, a DAS headend splits the input radio frequency (RF) signal into separate signal portions and routes them as digital-optical signals to the antenna nodes via fiber optic or other suitable transmission links (e.g., coaxial cables). Each antenna node then transmits only its RF signal portion. The DAS headend also receives signal portions from the antenna nodes, and combines them for transmission to other network devices.

Accordingly, local network 100, as depicted in FIG. 1, comprises DAS headends 108, 110, and 112. DAS headend 108 may be associated with one or more antenna nodes 102 that radiate to define wireless coverage areas 102A and 102B. Similarly, DAS headend 110 may be associated with one or more antenna nodes 104 that radiate to define wireless coverage areas 104A and 104B. Likewise, DAS headend 112 may be associated with one or more antenna nodes 106 that radiate to define wireless coverage areas 106A and 106B. Despite FIG. 1 depicting a DAS, the embodiments herein do not require the depicted DAS architecture to operate. Thus, these embodiments may employ various BTS architectures (e.g., macro-cells, micro-cells, pico-cells, femto-cells, distributed BTSs, or other types of BTS architectures now known or developed in the future).

Each wireless coverage area may provide air interface access to WCDs (not shown). The air interfaces may include forward links from the antenna nodes to WCDs and reverse links from WCDs to the antenna nodes. WCDs may exchange signaling, voice, data, video, or other media through the forward and reverse links. In this regard, WCDs may use the wireless coverage areas to communicate with one or more endpoints, e.g., other WCDs, e-mail servers, world wide web servers, gaming servers, media servers, media gateways, or location-based services, via a packet-switched network and/or a circuit-switched network.

The air interface(s) of local network 100, as well as at least some of the inter-device communication taking place in local network 100, may operate according to one or more wireless networking technologies and/or standards. Thus, for instance, forward air interface channels between the antenna nodes and WCDs may be formed via a set of orthogonal Code Division Multiple Access (CDMA) Walsh codes, each of which may be used to modulate the data that the antenna nodes transmit on a particular channel. The channels may include a pilot channel, over which a phase offset pattern is repeatedly transmitted, a sync channel over which synchronization data is transmitted (e.g., including a time reference available to the antenna nodes), and traffic channels over which the data directed to WCDs is transmitted. Additionally, one or more of the Walsh codes may be designated as primary and/or secondary paging channels.

The reverse channels may also be formed through the use of CDMA and may include, for example, an access channel for responding to paging messages, and reverse traffic channels. Of course CDMA is not the only technology that can provide wireless forward and reverse link channels, and other technologies may be used instead. These other technologies include, but are not limited to, Worldwide Interoperability for Microwave Access (WIMAX®), Universal Mobile Telecommunications System (UMTS®), the Global System for Mobile Communications (GSM), Long Term Evolution (LTE®), IDEN®, and Wifi.

While each antenna node defines two wireless coverage areas in FIG. 1, an antenna node may be configured to define more or fewer wireless coverage areas. Further, FIG. 1 also depicts the two respective wireless coverage areas defined by each of antenna nodes 108, 110, and 112 overlapping to some extent. In alternate embodiments, these wireless coverage areas may overlap to any degree or not overlap at all. Moreover, each of the wireless coverage areas may be defined using different carrier frequencies. Alternatively, at least some of the wireless coverage areas may be defined with the same carrier frequency, and therefore may be able to provide WCDs with a substantially continuous wireless coverage as these WCDs are handed off from antenna node to antenna node and/or from DAS headend to DAS headend. In some embodiments, local network 100 may own, license, or otherwise use its own frequencies. These frequencies can either be used by specific WCDs provisioned to prefer using these frequencies, or these frequencies may be used by some or all WCDs as a shared resource.

The DAS headends may be combined with one or more antenna nodes. Alternatively or additionally, DAS headends may be combined with a base station controller (BSC) 114 and/or other network equipment. Also, BSC 114 may be combined with the mobility gateway 116. Alternatively or additionally, both BSC 114 and one or more DAS headends may be combined with mobility gateway 116.

In regard to BSC 114, this device may control multiple DAS headends and/or antenna nodes by determining how each DAS headend and/or antenna node manages the WCDs in the respective antenna nodes' wireless coverage areas. For example, BSC 114 may instruct DAS headend 108 to assign wireless channels to a WCD, increase or decrease power the WCD, or hand the WCD off to a different DAS headend. In some embodiments, BSC 114 may route one or both of a WCD's circuit-switched and packet-switched communications through mobility gateway 116.

Mobility gateway 116 may be a general-purpose or purpose-built computing device that is configured to carry out at least some aspects of the embodiments described herein. Thus, mobility gateway 116 may receive traffic from WCDs (e.g., via the antenna nodes, DAS headends, and BSC 114), and route this traffic as appropriate to wireless network operator 124, wireless network operator 128, and Internet point of presence 120. Conversely, mobility gateway 116 may also receive traffic from wireless network operator 124, wireless network operator 128, and Internet point of presence 120, and route this traffic as appropriate to WCDs via BSC 114, the DAS headends, and the antenna nodes. Mobility gateway 116 may also route traffic between WCDs and other public or private networks such as 802.11 (Wifi) networks and public safety networks.

Mobility gateway 116 may also be configured to carry out various features described herein, such as but not limited to provisioning of WCDs, authentication of WCDs, and controlling the network access, access to local services, quality of service, and other features available to these WCDs. To that point, mobility gateway 116 may control WCD access to local content server 122, perhaps allowing some WCDs to access this server while preventing other WCDs from accessing the server.

Local content server 122 may be a server device that contains or has access to various types of content (e.g., web pages, media files, and/or media streams). This content may be premium content that is only available to certain WCDs using local network 100. Alternatively or additionally, local content server 122 may contain a cache of content from other sources (e.g., a web cache or media cache).

Additionally, mobility gateway 116 may be provisioned, configured, managed, and/or otherwise controlled through operations, administration, maintenance, and provisioning (OAMP) device 118. OAMP device 118 may be, for example, a management console that communicates with mobility gateway 116, and perhaps other devices in local network 100, via the Simple Network Management Protocol (SNMP). Accordingly, mobility gateway 116 may support one or more Management Information Base (MIB) objects that provide access to data representing the configuration and/or settings of mobility gateway 116. It should be understood that SNMP need not be supported to perform OAMP functions on devices. Other protocols, standard or proprietary, may be used to accomplish the same purpose.

Remote network 101 may include wireless operator network 124, which may contain or have access to Home Location Register/Home Subscriber Server (HLR/HSS) 126. Remote network 101 may also include wireless operator network 128, which may contain or have access to HLR/HSS 130. Each of wireless operator network 124 and wireless operator network 128 may be operated by a different wireless service provider.

For instance, wireless operator network 124 may be operated by a nationwide cellular service provider, and wireless operator network 128 may be operated by a regional cellular service provider. Furthermore, the nationwide cellular service provider may own or license the carrier frequencies used by wireless coverage areas 102A, 104A, and 106A, while the regional cellular service provider may own or license the carrier frequencies used by wireless coverage areas 102B, 104B, and 106B. Thus, local network 100 may provide service to WCDs that subscribe to either the nationwide wireless operator or the regional cellular service provider.

Moreover, wireless operator network 124 and wireless operator network 128 may be able to hand off WCDs to the wireless coverage areas of local network 100. Likewise, local network 100 may be able to hand off WCDs to wireless operator network 124 or wireless operator network 128. These handoffs may occur in a way that is partially or completely transparent to the users of these WCDs.

Thus, for instance, a user of a WCD may be engaged in a voice or data call while served by wireless operator network 124. As the user moves from the coverage of wireless operator network 124 to that of local network 100, the WCD may be handed off to wireless coverage area 102A without dropping the call. Then, perhaps several minutes later, while still engaged in the call, the user may move from the coverage of local network 100 back to that of wireless operator network 124. Again, the WCD may be handed off between these networks without dropping the call.

Aside from HLR/HSS 126 and 130, respectively, each of wireless operator network 124 and wireless operator network 128 may contain other devices. These other devices may include but are not limited to BTSs, BSCs, mobile switching centers (MSCs), tandem switches, signaling proxies, media gateways, routers, firewalls, content servers, and other types of equipment that facilitate voice and/or data communication.

HLR/HSS 126 and 130 may contain subscriber records for WCDs subscribed to wireless operator network 124 and wireless operator network 128, respectively. Thus, HLR/HSS 126 and 130 may store or have access to identifying information of these WCDs. This identifying information may include, but is not limited to, network access identifiers (NAIs), mobile directory numbers (MDNs), mobile identification numbers (MINs), international mobile subscriber identifiers (IMSIs), electronic serial numbers (ESNs), mobile equipment identifiers (MEIDs), and Internet Protocol (IP) addresses. Any of these types of WCD identifiers, or other data that can be used to identify WCDs, may be used to identify WCDs subscribed to wireless operator network 124 or wireless operator network 128.

Various devices in wireless operator network 124 may query HLR/HSS 126 in order to authenticate a WCD attempting to gain access to wireless operator network 124. Additionally, various devices in wireless operator network 124 may query HLR/HSS 126 in order to determine whether a WCD is authorized to use a particular service. Similarly, various devices in wireless operator network 128 may query HLR/HSS 130 in order to authenticate a WCD attempting to gain access to wireless operator network 128. Moreover, various devices in wireless operator network 128 may query HLR/HSS 130 in order to determine whether a WCD is authorized to use a particular service.

In addition to devices in wireless operator network 124 and wireless operator network 128 querying HLR/HSS 126 and 130, respectively, devices in other networks may also query HLR/HSS 126 and/or 130 to authenticate or determine the authorization of WCDs. As will be discussed in the following sections, mobility gateway 116 is a device that may query HLR/HSS 126 and/or 130.

2. Mobility Gateway Hardware and Software Architecture

Figure 2:
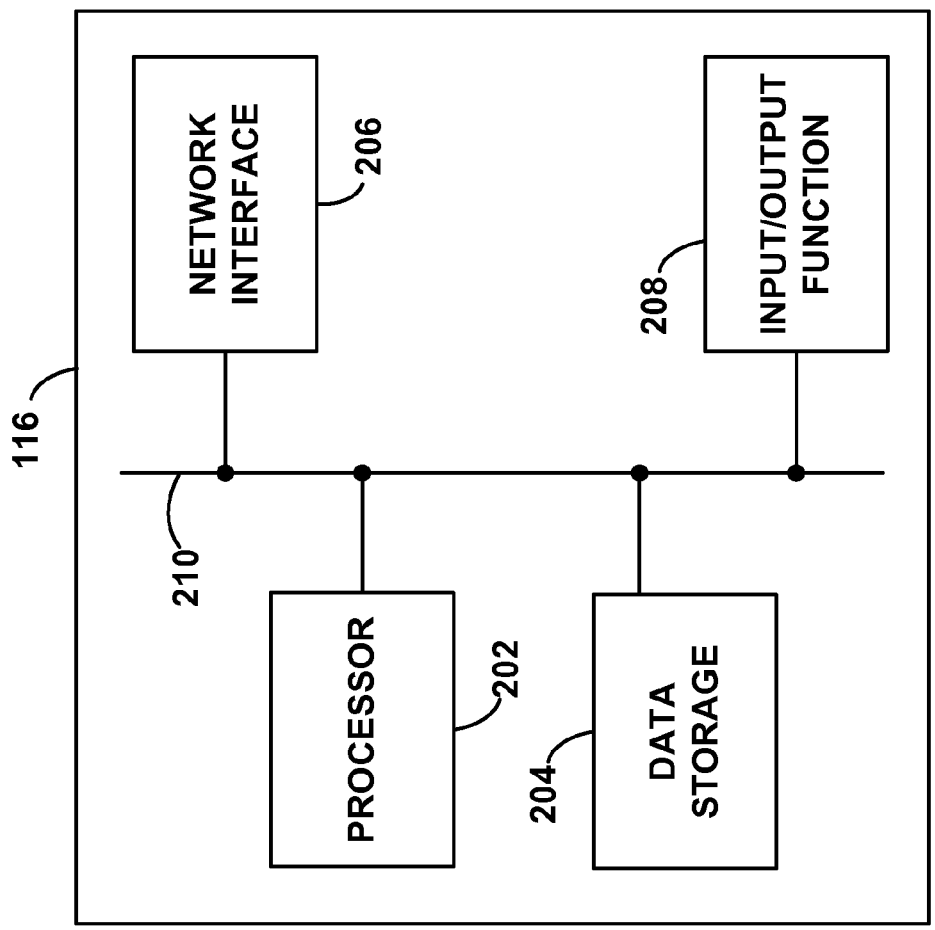
FIG. 2 is a block diagram of a computing device, in accordance with an example embodiment.

FIG. 2 is a simplified block diagram exemplifying mobility gateway 116, and illustrating one or more of the functional elements that may be found in a device arranged to operate in accordance with the embodiments herein. Mobility gateway 116 could be any type of device capable of networked communication. Thus, mobility gateway 116 could be a desktop computing device, a server device, or a cluster of server devices. For purposes of illustration, mobility gateway 116 may be described as a server device. Nonetheless, it should be understood that the description of mobility gateway 116 and its components may apply to other types of devices.

Mobility gateway 116 may include a processor 202, a data storage 204, a network interface 206, and an input/output function 208, all of which may be coupled by a system bus 210 or a similar mechanism. Processor 202 may include one or more CPUs, such as one or more general purpose processors and/or one or more dedicated processors (e.g., application specific integrated circuits (ASICs) or digital signal processors (DSPs), etc.).

Data storage 204, in turn, may comprise volatile and/or non-volatile data storage and can be integrated in whole or in part with processor 202. Data storage 204 may store program instructions, executable by processor 202, and data that is manipulated by these instructions to carry out the various methods, processes, or functions described herein. Alternatively, these methods, processes, or functions can be defined by hardware, firmware, and/or any combination of hardware, firmware and software. Therefore, data storage 204 may be a non-transitory computer-readable medium, having stored thereon program instructions that, upon execution by mobility gateway 116, cause mobility gateway 116 to carry out any of the methods, processes, or functions disclosed in this specification or the accompanying drawings.

Network interface 206 may be an interface for a wireline connection, such as an Ethernet, Token Ring, or T-carrier connection. Alternatively or additionally, network interface 206 may be an interface for a wireless connection, such as IEEE 802.11 (Wifi), BLUETOOTH®, or a wide-area wireless connection. However, network interface 206 may support other forms of physical layer connections and other types of standard or proprietary communication protocols. Furthermore, network interface 206 may comprise multiple physical communication interfaces.

Input/output function 208 may facilitate user interaction with example mobility gateway 116. Input/output function 208 may comprise one or more of any type of input device, such as a keypad, a keyboard, a mouse, a scroll wheel, a microphone, a joystick, a touch screen, a switch, a button, etc. Similarly, input/output function 208 may comprise one or more of any type of output device, such as a video screen, a monitor, a printer, a speaker, a light emitting diode (LED), etc. Additionally or alternatively, example mobility gateway 116 may support remote access from another device, via network interface 206 or via another interface (not shown), such an RS-232 or Universal Serial Bus (USB) port.

3. Example Message Flows

Figure 3A:
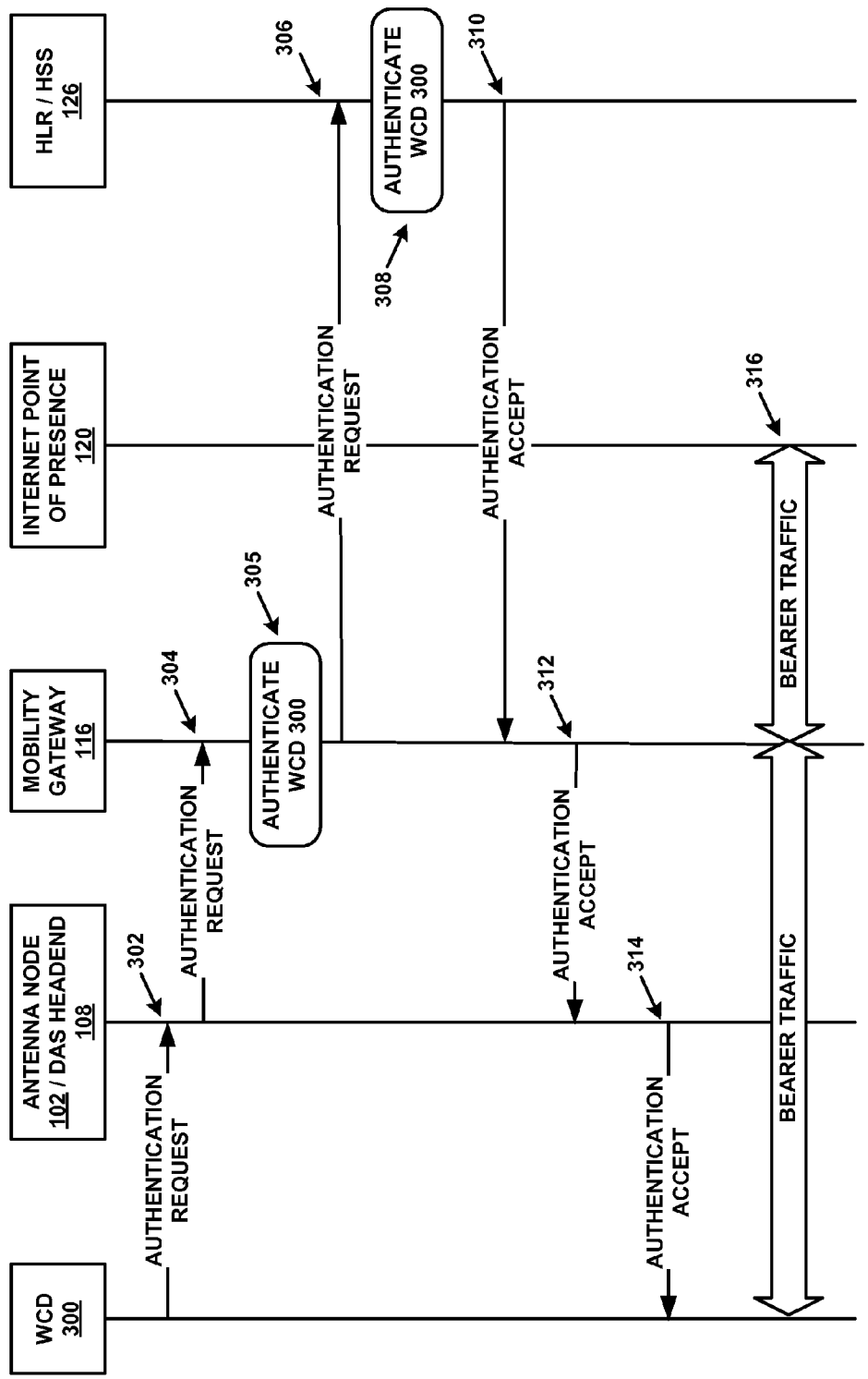
FIG. 3A depicts a message flow, in accordance with an example embodiment.

FIG. 3A is a message flow depicting a possible embodiment for authenticating a WCD. In FIG. 3A, WCD 300 may be subscribed to wireless operator network 124. Further, WCD 300 may be attempting to use wireless coverage area 102A for communication. In order to do so, WCD 300 may first have to authenticate itself to local network 100. Here, authentication of a WCD may generally refer to local network 100 verifying that WCD 300 is a subscriber of one or more wireless service providers and/or determining that local network 100 is configured to provide service to WCD 300.

Thus, at step 302, WCD 300 may transmit an authentication request via antenna node 102 to DAS headend 108. This authentication request may take various forms that may be specific to a type of wireless technology that WCD 300 is using to communicate with antenna node 102 and DAS headend 108 (e.g., CDMA, WIMAX®, UMTS®, LTE®, IDEN®, or Wifi). Particularly, the authentication request may include a WCD identifier of WCD 300, such as an NAI, MDN, MIN, IMSI, ESN, MEID, and/or IP address. The authentication request may also include some form of password or authentication token that can be used to validate that the authentication request was generated by WCD 300.

At step 304, DAS headend 108 may transmit the authentication request to mobility gateway 116. At step 305, perhaps in response to receiving the authentication request, mobility gateway 116 may locally authenticate WCD 300. This authentication may take various forms. In some embodiments, mobility gateway 116 may contain or have access to a local database of WCD identifiers, similar to those of HLR/HSS 126 and/or 130. However, this local database may contain WCD identifiers of WCDs that are subscribed to various wireless service providers. To locally authenticate WCD 300, mobility gateway 116 may look up the WCD identifier of WCD 300 in the local database. If an entry for the WCD identifier is found in the local database and this entry indicates that WCD 300 is permitted to use local network 100, WCD 300 may be considered to be locally authenticated.

Alternatively or additionally, at steps 306 through 310, mobility gateway 116 may remotely authenticate WCD 300 with the assistance of HLR/HSS 126. Thus, at step 306, mobility gateway 116 may transmit an authentication request to HLR/HSS 126. At step 308, perhaps in response to receiving the authentication request, HLR/HSS 126 may authenticate WCD 300. In performing the authentication, HLR/HSS 126 may look up a WCD identifier of WCD 300 in a database. If the WCD identifier is found in the database and the associated database entry indicates that WCD 300 is authorized for network access, then at step 310, HLR/HSS 126 may transmit an authentication accept to mobility gateway 116. The authentication accept may indicate that WCD 300 is authenticated and authorized for network access.

In order to facilitate remote authentication with the proper wireless service provider (e.g., the wireless service provider to which WCD 300 subscribes), the local database at mobility gateway 116 may map WCD identifiers to wireless service providers. Thus, for instance, the local database may include an entry for WCD 300 that indicates that WCD 300 subscribes to wireless operator network 124.

It should be understood that mobility gateway 116 may perform just local authentication, remote authentication by communicating with another entity, or both local and remote authentication. Further, in some situations, mobility gateway 116 may skip some steps of local and/or remote authentication. For instance, if mobility gateway 116 is configured to use remote authentication but cannot communicate with a remote authentication device (e.g., HLR/HSS 126 and/or HLR/HSS 130), mobility gateway may allow WCDs to use local network 100 without authentication. In this way, WCDs can benefit from the use of local network 100 even when, for example, connectivity between local network 100 and wireless operator network 124 and/or wireless operator network 128 is unavailable.

Regardless, at step 312, after WCD 300 is authenticated (or mobility gateway 116 determines that WCD 300 does not need to be authenticated), mobility gateway 116 may transmit an authentication accept to DAS headend 108. At step 314, DAS headend 108 may, in turn, transmit the authentication accept via antenna node 102 to WCD 300.

Perhaps in response to receiving the authentication accept, WCD 300 may engage in communication with one or more other networked devices. Thus, at step 316, WCD 300 may transmit and/or receive bearer traffic (e.g., non-signaling voice or data traffic), via mobility gateway 116, to and from Internet point of presence 120. One possible advantage of doing so is to offload this bearer traffic from wireless operator network 124 and one or more backhaul links between local network 100 and wireless operator network 124.

Figure 3B:
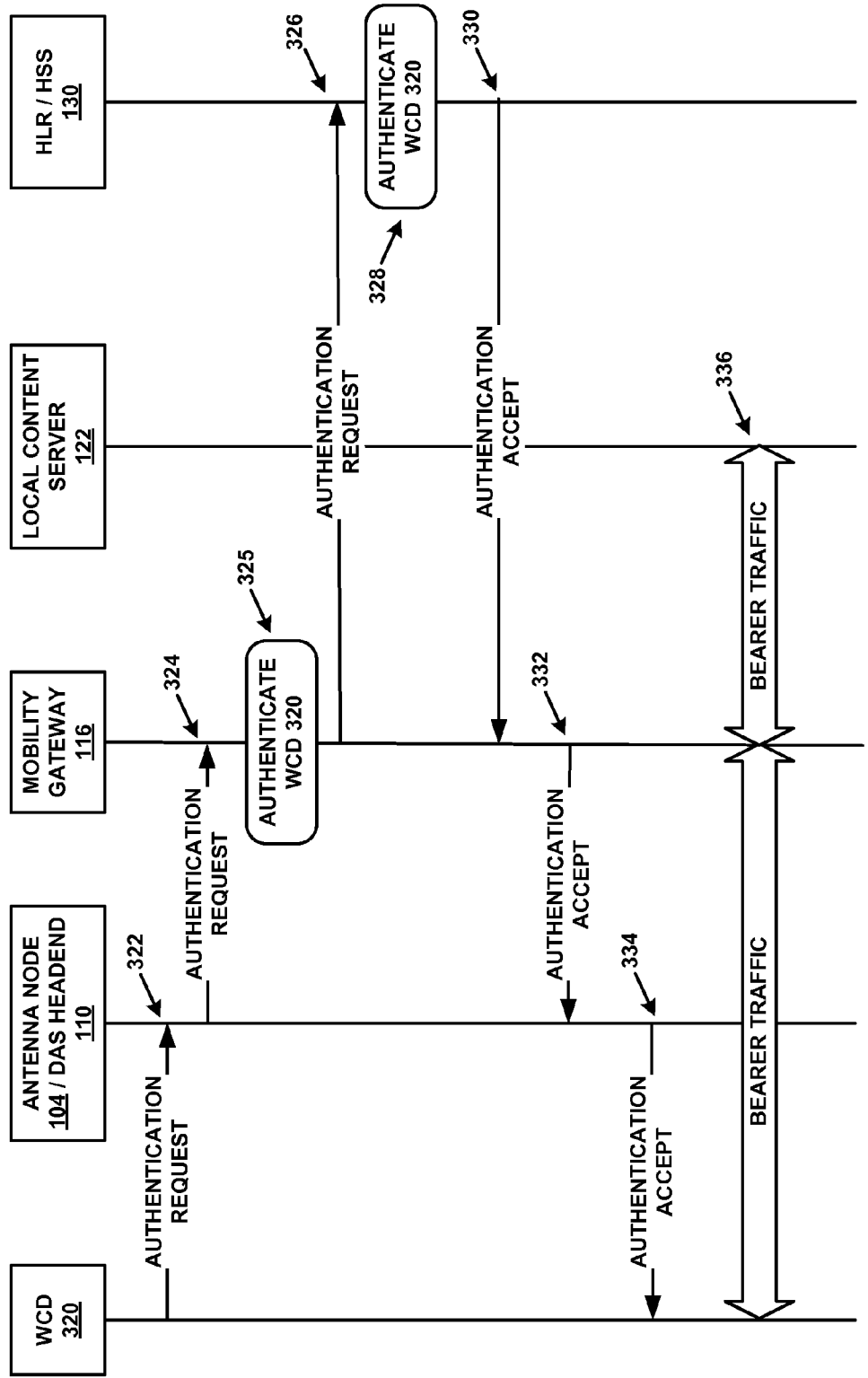
FIG. 3B depicts another message flow, in accordance with an example embodiment.

FIG. 3B is a message flow depicting another possible embodiment for authenticating a WCD. To some extent, FIG. 3B depicts a scenario similar to that of FIG. 3A. Therefore, some aspects of FIG. 3B are omitted to avoid repetition. Thus, where appropriate, the description of FIG. 3B should be read in the context of the description of FIG. 3A.

In FIG. 3B, WCD 320 may be subscribed to wireless operator network 128. Further, WCD 320 may be attempting to use wireless coverage area 104B for communication with local content server 122. In order to do so, WCD 320 may first have to authenticate itself to local network 100. Thus, at step 322, WCD 320 may transmit an authentication request via antenna node 104 to DAS headend 110. At step 324, DAS headend 110 may transmit the authentication request to mobility gateway 116.

At step 325, perhaps in response to receiving the authentication request, mobility gateway 116 may locally and/or remotely authenticate WCD 320. If WCD 320 is locally authenticated, mobility gateway may look up a WCD identifier of WCD 320 in a local database to determine whether WCD 320 can use local network 100. If WCD 320 is remotely authenticated, then at step 326, mobility gateway 116 may transmit an authentication request to HLR/HSS 130. At step 328, perhaps in response to receiving the authentication request, HLR/HSS 130 may authenticate WCD 320. If WCD 320 is authorized for network access, then at step 330, HLR/HSS 130 may transmit an authentication accept to mobility gateway 116.

At step 332, after WCD 320 is authenticated (or mobility gateway 116 determines that WCD 320 does not need to be authenticated), mobility gateway 116 may transmit an authentication accept to DAS headend 110. At step 334, DAS headend 110 may, in turn, transmit the authentication accept via antenna node 104 to WCD 320.

Perhaps in response to receiving the authentication accept, WCD 320 may engage in communication with one or more other networked devices. Thus, at step 336, WCD may transmit and/or receive bearer traffic. As shown in FIG. 3B, mobility gateway 116 may forward this bearer traffic between WCD 320 and local content server 122.

As noted above, in some embodiments local content server 122 may provide premium content to WCDs, and the authentication process described above may specifically authorize WCD 320 to be able to access this premium content. Thus, mobility gateway 116 may only allow such authorized WCDs to access local content server 122. Additional aspects of this feature are described below.

As illustrated in the message flows of FIGS. 3A and 3B, two different WCDs, each subscribed to a different service provider, may both be granted wireless service in local network 100. Advantageously, each of their respective wireless service providers need not have any equipment or wireless coverage in the vicinity of local network 100. Additionally, local network 100 may serve to offload traffic from the networks of these wireless service providers, while allowing local policies to be applied to the WCDs.

4. Local Calling Features

The general architecture of local network 100 may support various local calling features. One aspect of local calling is assignment and use of local telephone numbers with which WCDs using local network 100 can call each other. Another aspect of local calling is to route traffic directly between two WCDs using local network 100, such that this traffic does not leave local network 100. Both of these features are optional, and may be deployed individually or together.

Local calling may also facilitate direct calling between a WCD using local network 100 and a wireless or wireline phone in local network 100. For instance, local network 100 may include private branch exchange (PBX) components that enable a local calling plan, and a WCD using local network 100 may be added to that local calling plan.

FIG. 4 depicts an example embodiment of some of these aspects of local calling. In FIG. 4, it is assumed that WCD 300 has been assigned a standard-format telephone number (e.g., 111-222-3333) by wireless operator network 124, and that WCD 300 may use this number for telephony services on local network 100, as well as the PSTN and/or various voice over IP (VOIP) networks. It is also assumed that WCD 320 has been assigned a standard-format telephone number (e.g., 444-555-6666) by wireless operator network 128, and that WCD 320 may use this number for telephony services on local network 100, as well as the PSTN and/or various VOIP networks.

Additionally, perhaps during the authentication procedures depicted in FIGS. 3A and 3B, WCD 300 and WCD 320 may be assigned the local numbers 1234 and 5678, respectively. In some embodiments, these numbers may only have a significance on local network 100. Thus, for example, while WCD 300 and WCD 320 are both on local network 100, WCD 300 may be able to dial 5678 to directly contact WCD 320, and WCD 320 may be able to dial 1234 to directly contact WCD 300. However, WCD 300 could potentially still dial 444-555-6666 to reach WCD 320, and WCD 320 could potentially still dial 111-222-3333 to reach WCD 300.

Thus, at step 400, WCD 300 may transmit a call setup request to antenna node 102 and/or DAS headend 108. This call setup request may indicate that WCD 300 is using its local number 1234 in an attempt to call the local number 5678. At step 402, antenna node 102 and/or DAS headend 108 may transmit the call setup request to mobility gateway 116.

At step 404, perhaps in response to receiving the call setup request, mobility gateway 116 may determine that 5678 is a local number. Further, mobility gateway 116 may also determine that 5678 has been assigned to WCD 320. Accordingly, at step 406, mobility gateway 116 may transmit the call setup request to antenna node 104 and/or DAS headend 110, and at step 408, antenna node 104 and/or DAS headend 110 may transmit the call setup request on to WCD 320.

At step 410, possibly in response to receiving the call setup request, WCD 320 may transmit a call setup accept to antenna node 104 and/or DAS headend 110. The call setup accept may indicate that the call to be set up would be between WCDs with local numbers 1234 and 5678. At step 412, antenna node 104 and/or DAS headend 110 may transmit the call setup accept on to mobility gateway 116.

At step 414, possibly in response to receiving the call setup accept, mobility gateway 116 may establish a call between WCD 300 and WCD 320. At step 416, perhaps as part of establishing this call, mobility gateway 116 may transmit the call setup accept to antenna node 102 and/or DAS headend 108. At step 418, antenna node 102 and/or DAS headend 108 may transmit the call setup accept to WCD 300.

As noted above, another aspect of local calling is direct traffic routing between a caller and a callee. At step 420, mobility gateway 116 may facilitate direct traffic routing between WCD 300 and WCD 320. Thus, bearer traffic transmitted by WCD 300 to WCD 320 may reach mobility gateway 116, and based on the call set up between these WCDs, mobility gateway 116 may route this traffic to WCD 320. Likewise, bearer traffic transmitted by WCD 320 to WCD 300 may reach mobility gateway 116, and based on the call set up between these WCDs, mobility gateway 116 may route this traffic to WCD 300. In at least some embodiments, this bearer traffic may only use local network 100. Therefore, the load on other networks, such as wireless operator network 124 and wireless operator network 128, is reduced.

In order to carry out these steps, mobility gateway 116 may include call control and bearer transport components. For instance, mobility gateway 116 may include a Session Initiation Protocol (SIP) and/or a H.323 call control function. Additionally, mobility gateway 116 may include a media gateway function for transmitting, receiving, forwarding, and/or bridging bearer traffic between two or more WCDs.

Moreover, mobility gateway 116 may include a charging component that creates call detail records (CDRs) based on local calling activity, and forwards these CDRs to other entities. Thus, for the call between WCD 300 and WCD 320 depicted in FIG. 4, mobility gateway 116 may forward one or more CDRs for this call to wireless operator network 124 and/or wireless operator network 128.

5. WCD Traffic Differentiation

A possible advantage of the embodiments herein is that local network 100 can differentiate the traffic of WCDs based on these WCD's respective WCD identifiers, locations, requested content, and/or other factors. This traffic differentiation may include one or more devices in the local network granting traffic to and from certain WCDs priority over traffic from other WCDs. Thus, traffic differentiation may involve assigning WCDs and/or their traffic a priority level from two or more predefined priority levels. Alternatively or additionally, the WCDs may be granted a certain bit rate, delay bound, jitter bound, packet dropping rate, and/or bit error rate.

For instance, when the local network is congested, a mobility gateway may process authentication requests (or other signaling or bearer traffic) from higher-priority WCDs with precedence over similar types of traffic from lower-priority WCDs. For data communications involving these WCDs, the mobility gateway (and perhaps over devices as well) may process and/or forward packets to and from higher-priority WCDs with precedence over packets from lower-priority WCDs. Alternatively or additionally, WCDs may be allowed or denied access to local network 100 based on their respective priorities. In some embodiments, a WCD may receive (or not receive) alerts and/or messages (e.g., text messages) based on its priority.

A. Based on WCD Identifier

As noted above, a WCD may present a WCD identifier while requesting authentication. This WCD identifier may take various forms, including, for example, a phone number or an IP address. Possibly based on this WCD identifier, local network 100 may determine what level of service to grant to the WCD, and may then apply that level of service.

For example, some users may pay for premium data communication services while they are on local network 100. Therefore, data packets to and from the IP address(es) assigned to these users' WCDs may be granted a higher priority than data packets to and from the IP address(es) assigned to other users' WCDs. Alternatively, other users may have a higher status in the organization operating local network 100, and their communications may be given a higher priority on that basis.

In some embodiments, a WCD identifier can be the basis of granting or denying the associated WCD access to one or more of a network (e.g., network point of presence 120), content (e.g., content server 122), and/or any other service or information.

B. Based on WCD Location

One or more components of local network 100 may be able to determine the physical locations of WCDs using the coverage of local network 100. For example, a WCD that is served by a particular antenna node will be within one of the wireless coverage areas of this antenna node. This particular wireless coverage area may be represented as a cell identifier, sector identifier, or some other type of identifier. Further, the antenna node, perhaps along with a DAS headend and/or one or more other devices, may be able to determine a relatively precise location of the WCD based on signals received from the WCD.

Alternatively, the WCD's location may be found by the WCD reporting its location (perhaps facilitated by Global Positioning System (GPS) functions of the WCD) to local network 100. In some embodiments, a WCD may be in communication with multiple antennas, and mobility gateway 116 (or perhaps some other element of local network 100), may be able to use information received by these antennas to triangulate the location of the WCD. Other ways of determining the WCD's location may also be possible, such as time difference of arrival (TDOA), advanced forward link trilateration (AFLT), and so on.

Regardless, once the WCD's location is determined, mobility gateway 116 may use this location to determine, and then grant, a particular priority to the WCD's traffic. Mobility gateway 116 may also use the determined location to grant or deny the WCD access to networks, devices, and/or services.

C. Based on WCD Actions

A WCD can also be granted a particular traffic priority, and/or granted or denied the access to networks, devices, and/or services, based on one or more of the WCD's actions. For instance, if the WCD is transmitting or receiving an unusually large volume of data (e.g., exceeding a data volume usage threshold), or transmitting or receiving data at an unusually large rate (e.g., exceeding a data rate usage threshold), local network 100 may lower the WCD's traffic priority for at least a period of time. In this way, the WCD is prevented from using more than a portion of the capacity of local network 100.

Alternatively, local network 100 may partially or completely deny the WCD access to the network. In some embodiments, the WCD may be completely blocked from using local network 100. In other embodiments, the WCD may be blocked from only using certain services or from accessing certain devices on local network 100.

D. Based on Network Load or Condition

A WCD can also be granted a particular traffic priority, and/or granted or denied the access to networks, devices, and/or services, based on the load and/or a condition of local network 100. For example, if local network 100 is experiencing a high load (e.g., above a load threshold), local network 100 may lower the traffic priority of one or more WCDs in order to reduce the impact of this load. Alternatively or additionally, local network 100 may deny one or more WCDs access to one or more networks, devices, and/or services until the load is at a lower level.

E. Based on Date, Day, or Time

A WCD can also be granted a particular traffic priority, and/or granted or denied the access to networks, devices, and/or services, based a date, day, or time. For example, a WCD user may purchase a premium service for a particular period of time. During this period of time, the user's WCD may be granted a high traffic priority, access to premium content, and/or access to other services.

F. Behavioral Control and Management

Control and management of a WCD may also be based on historical patterns of activity of that WCD and/or its associated user. These historical patterns may be recorded in a database. Then, a rules engine may operate on the data therein to apply control and management techniques. For instance, if a WCD assigned to a user is detected in a location that is outside of the user's and/or WCD's typical locations for more than a certain percentage of a given period of time (e.g., more than 60% of an hour), the rules engine may flag the user's and/or WCD's behavior as suspicious, and may either monitor or restrict service to the WCD. Similarly, if the WCD is sending and/or receiving data at, for example, more than two times the usual amount for a period of time, the rules engine may flag the user's and/or WCD's behavior as suspicious, and may either monitor or restrict service to the WCD.

6. Example Scenarios

In the following subsections, various example scenarios are presented in order to further illustrate the wide range of uses for the embodiments described herein. Nonetheless, it should be noted that these examples scenarios are non-exclusive, and other scenarios that use one or more of these embodiments may exist. Further, any of the embodiments described herein can be used, alone or in combination, in any of the scenarios described below.

A. Corporate Facility

Corporate facilities may include office buildings, office campuses, warehouses, factories, and other types of locations. The embodiments herein can be used in a corporate facility to provide employees or other personnel associated with the building a differentiated service relative to visitors. This differentiated service can include the ability for these individuals' WCDs to (i) use the in-building or campus wireless network, (ii) use a local calling plan when they are within the facility, (iii) obtain a higher traffic priority than the visitors' WCDs, and/or (iv) access to networks, devices, and/or services that visitors are barred from accessing.

For example, in a corporate office building, a local network (e.g., perhaps similar to local network 100) may be configured to provide three levels of service. The highest level of service may be granted to corporate executives. They may be given the highest level of traffic priority, and may be granted access to networks, devices, and/or services that are not available to other users. The medium level of service may be granted to non-executive employees. Their traffic priority may be lower than that of the executives, and they may have access to fewer networks, devices, and/or services. The lowest level of service may be granted to visitors. Their traffic priority may be lower than that of executives and non-executive employees,

B. Military Facility

Military facilities may include bases, office buildings, training facilities, shipyards, and so on. The embodiments herein can be used to provide certain military personnel local network access while preventing other personnel and/or visitors from using the local network.

For example, some military bases provide officers and enlisted personnel access to sensitive data (e.g., secret or top secret information). These bases may have policies that prohibit the use of WCDs, such as cell phones, while on the base in order to enhance the security of this data. However, a complete ban on WCDs may be unnecessarily harsh, as well as inconvenient.

As an alternative, the local network may limit WCD use while on the base to, for example, just high-ranking officers. In another alternative, the local network may limit WCD use to certain locations of the base. For instance, in buildings in which secret or top secret files are kept, all WCD usage may be blocked. However, away from these buildings, WCD usage may be allowed.

Further, the local network may grant officers a higher traffic priority than enlisted persons, and may also grant officers access to networks, devices, and/or services not available to enlisted persons.

C. Sports Facility

A sports facility may be any type of stadium, arena, gymnasium, or coliseum in which any sort of sporting event may take place. A popular sporting event, such as the Super Bowl or a World Series game, will often have a large number of fans (perhaps tens of thousands) crowded into a relatively small geographic area. As a result, wide-area wireless coverage to these facilities may be severely congested due to the traffic generated by these fans. However, even regular-season games can draw large crowds and thereby result in congestion on wide-area wireless networks.

Thus, it may be advantageous for the owner of such a facility to provide or sell premium wireless services to attendees of the sporting events therein. For instance, the premium service may include an option to access a local network, so that attendees who purchase the premium service are permitted to use the local network. Alternatively, use of the local network may be free to all attendees (thus offloading the wireless service provider networks), but the owner could sell access to premium content via the local network. For instance, attendees may be able to view instant replays, statistics, commentary, or streaming video feeds of various camera angles or even other games.

Particularly, suppose that a football stadium offers attendees the option of purchasing premium wireless services. An attendee who purchases these services may have access to a web-based local content service (e.g., not unlike local content server 122). From this service, the attendee may be able to view, with his or her WCD, video feeds of various live camera angles of the game, instant replays of the game, games or game highlights from the football league, as well as player statistics and other information.

Some of the video feeds may also be a further premium service. For instance, a video camera may be mounted on a player's or referee's helmet. Thus, the resulting video feed would provide the attendee a first-person, on-field perspective of the game.

Some premium services may be provided only to particular WCDs. For instance, a season ticket holder may be able to register his or her WCD for free access to at least some premium services. Also, premium services may be provided based on location as well. For example, if an attendee purchases a luxury box seat at the stadium, the local network may grant any WCD in the vicinity of such a seat automatic access to at least some premium services.

D. Medical Facility

Medical facilities include hospitals, clinics, doctor's offices, and medical testing labs. A local network in a hospital facility may provide traffic priority based on WCD identifier. For example, the WCDs of doctors and administrators may be granted the highest level of priority, nurses and technicians may be granted a medium level of priority, and patients and guests may be granted the lowest level of priority. Also, hospital employees may be granted access to networks, devices, and/or services not available to visitors.

Additionally, vendors and/or contractors who work at the hospital, but are not hospital employees, may be granted time-limited access to the local network. This access may expire when the vendors' and/or contractors' contracts expire.

E. Retail Facilities, Museums, and Theme Parks

Retail facilities include stores, indoor or outdoor shopping malls, markets, shopping clubs, and wholesalers. Museums include galleries and institutes dedicated to science, history, and/or the arts. Theme parks include amusement parks, water parks, pools, and playgrounds.

As an example, a local network in a retail facility may provide the WCDs of shoppers with coupons, advertisements, and/or other information via text message or email. This information may be sent based on the WCD's location. For instance, as a shopper is walking past a shoe store, the local network may transmit a text message to the shopper's WCD indicating that the shoe store is offering a sale. Further, the information may also include direction to various nearby stores. Additionally, the local network may restrict shoppers' access to competing stores' web sites.

A local network in a museum or theme park may provide similar location based information to guests. For instance, guests may view maps of the museum or theme park, directions to certain exhibits or rides, and/or how long the wait is for admission to these exhibits or rides. Additionally, location-based messaging could also be used for crowd control and management.

F. School or Educational Facilities

Educational facilities or campuses include private and public educational institutions of all levels. A local network in such a facility may restrict the network access of students during certain locations and/or periods of time. For instance, the local network may prevent the student from making non-emergency communications via phone, text message, and/or Internet while in class or while taking an exam. Alternatively or additionally, students may be permitted to access certain content servers during class. For example, the instructor can place material on a content server and allow the students to access this content while in class.

G. Central Business Districts and Parking Lots

Central districts of small or large cities, as well as large parking lots, may benefit from the embodiments herein. The local network may transmit alerts, advertisements, and messages to WCDs in the coverage area based on their location. This information may be about events or ongoing activities, and/or may contain traffic or parking information. For instance, if a WCD is in a particular location in which all the parking lots are full, a message sent to the WCD may include directions to the nearest parking lot with capacity. These alerts, advertisements, and messages may be sent to a navigation or map application on the WCD, and may instruct that application to provide directions to parking lots with capacity and/or areas of interest.

7. Example Operations

Figure 5:
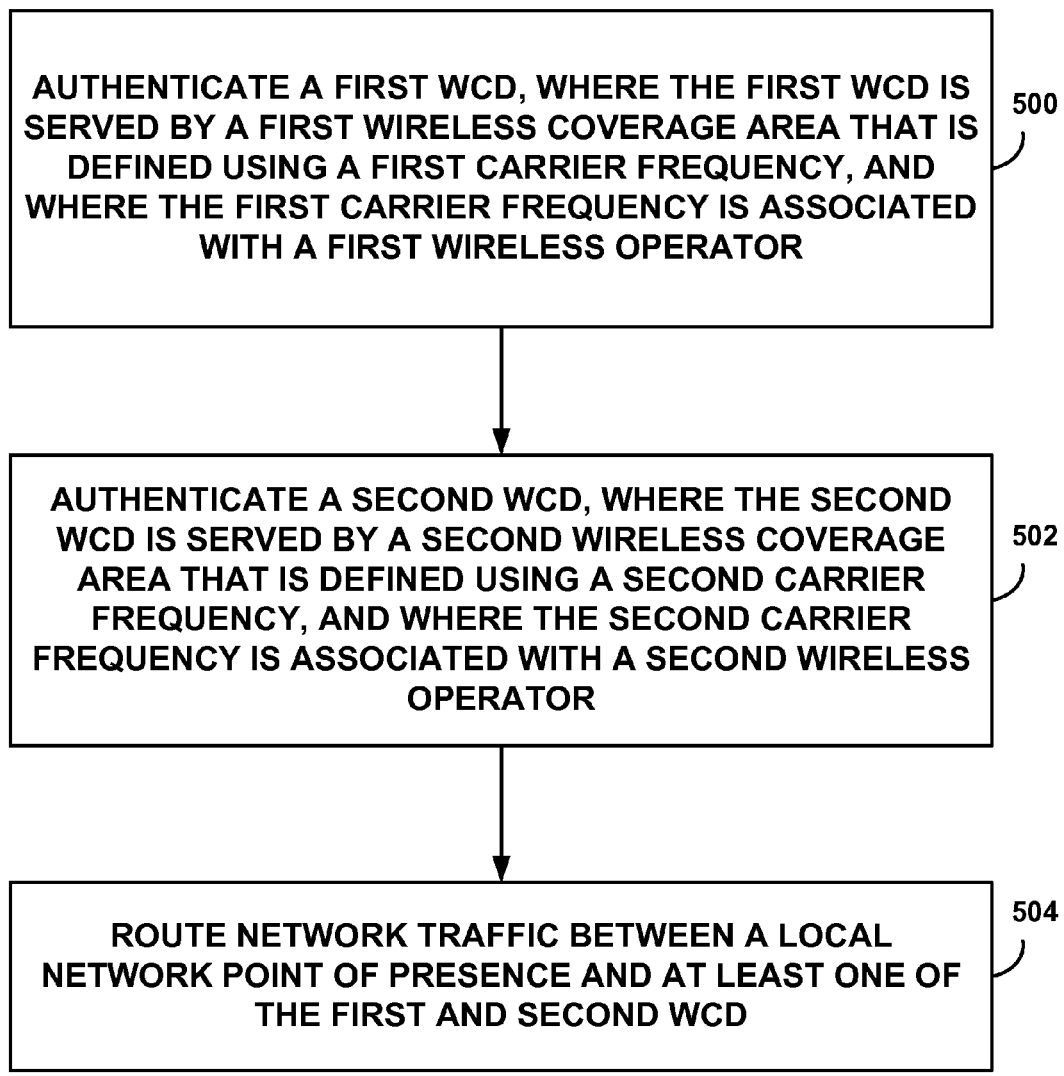
FIG. 5 depicts a flow chart, in accordance with an example embodiment.
Figure 6A:
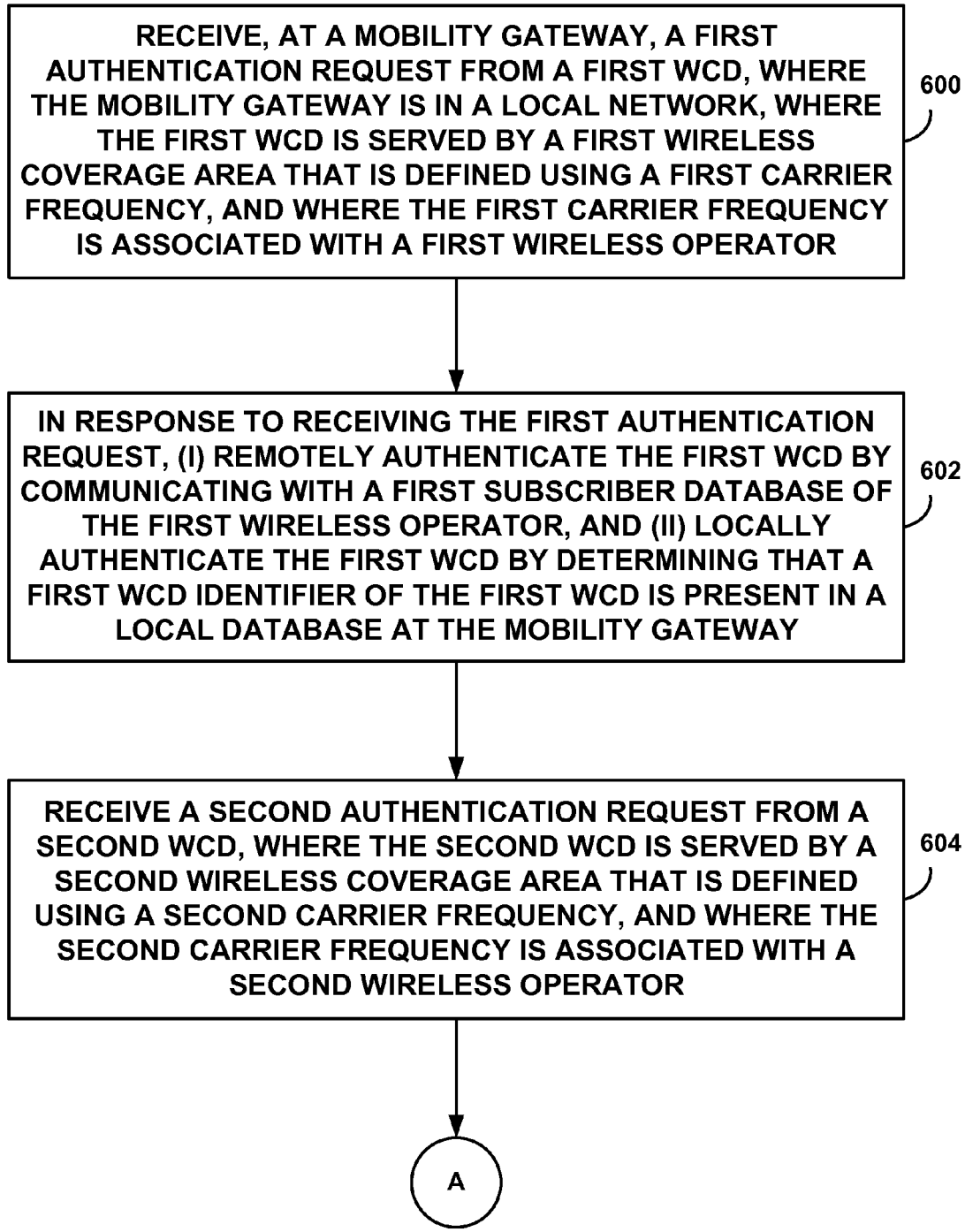
FIGS. 6A and 6B depict another flow chart, in accordance with an example embodiment.
Figure 6B:
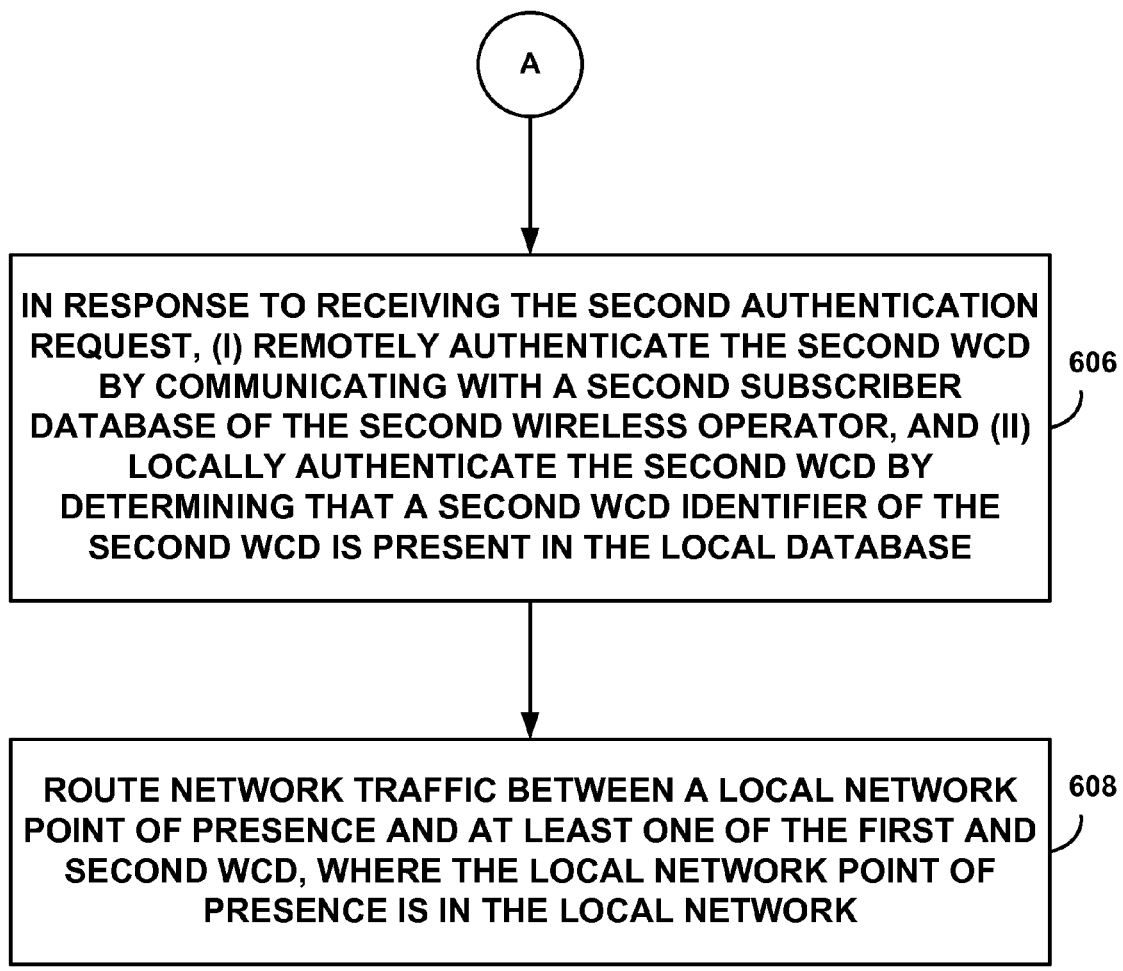

FIGS. 5, 6A, and 6B are flow charts that depict example embodiments. Generally speaking, the steps of these embodiments may be performed by one or more components of local network 100. In some cases, as a single component (e.g., mobility gateway 116) may perform all of the steps, while in other cases, different components may perform different steps.

At step 500 of FIG. 5, a first WCD may be authenticated. The first WCD may be served by a first wireless coverage area that is defined using a first carrier frequency. The first carrier frequency may be associated with a first wireless operator. Authenticating the first WCD may involve (i) communicating with a first subscriber database of the first wireless operator, and (ii) as a result of communicating with the first subscriber database, determining that the first WCD has a subscription with the first wireless operator.

At step 502, a second WCD may be authenticated. The second WCD may be served by a second wireless coverage area that is defined using a second carrier frequency. The second carrier frequency may be associated with a second wireless operator. The first and second wireless coverage areas may overlap or may be disjoint. Authenticating the second WCD may involve (i) communicating with a second subscriber database of the second wireless operator, and (ii) as a result of communicating with the second subscriber database, determining that the second WCD has a subscription with the second wireless operator.

At step 504, network traffic may be routed between a local network point of presence and at least one of the first and second WCD. This routing may involve allowing the first WCD to communicate via the network point of presence, and preventing the second WCD from communicating via the network point of presence.

In some embodiments, the first WCD may be allowed to communicate with a local content server, and second WCD may be prevented from communicating with the local content server. Alternatively or additionally, communications to and from the first WCD may be given priority over communications to and from the second WCD.

Further, if the first wireless coverage area and the second wireless coverage area cover two disjoint locations, then (i) based on the first WCD being served by the first wireless coverage area, a given service may be provided to the first WCD, and (ii) based on the second WCD being served by the second wireless coverage area, the second WCD may be blocked from using the given service. The given service may be one of a voice service, a data service, and a short message service.

In some embodiments, all network traffic to and from WCDs served by the first or second wireless coverage area may be routed through a mobility gateway and the common backhaul link. Additionally, telephony calls may be established between the first and second WCDs based on a local dialing plan. The local dialing plan may allow the first WCD to call the second WCD using a local phone number of six digits or less. Additionally, bearer traffic from telephony calls between the first and second WCD may be routed via a mobility gateway but not via a wireless operator network.

FIGS. 6A and 6B are a flow chart of another example embodiment. At step 600, a mobility gateway may receive a first authentication request from a first WCD. The mobility gateway may be in a local network. The first WCD may be served by a first wireless coverage area that is defined using a first carrier frequency. The first carrier frequency may be associated with a first wireless operator.

At step 602, possibly in response to receiving the first authentication request, the mobility gateway may (i) remotely authenticate the first WCD by communicating with a first subscriber database of the first wireless operator, and (ii) locally authenticate the first WCD by determining that a first WCD identifier of the first WCD is present in a local database at the mobility gateway.

At step 604, the mobility gateway may receive a second authentication request from a second WCD. The second WCD may be served by a second wireless coverage area that is defined using a second carrier frequency. The second carrier frequency may be associated with a second wireless operator. The first and second wireless coverage areas may overlap.

Turning to FIG. 6B, at step 606, possibly in response to receiving the second authentication request, the mobility gateway may (i) remotely authenticate the second WCD by communicating with a second subscriber database of the second wireless operator, and (ii) locally authenticate the second WCD by determining that a second WCD identifier of the second WCD is present in the local database.

At step 608, the mobility gateway may route network traffic between a local network point of presence and at least one of the first and second WCD. The local network point of presence may be in the local network. This routing may involve the mobility gateway allowing the first WCD to communicate via the network point of presence, and preventing the second WCD from communicating via the network point of presence. Further, the mobility gateway may allow the first WCD to communicate with a local content server, and prevent the second WCD from communicating with the local content server. The local content server may store or have access to local content.

The mobility gateway may also route network traffic between the network point of presence and an unauthenticated WCD. The unauthenticated WCD may be served by the first wireless coverage area or the second wireless coverage area, and the unauthenticated WCD may be establishing or engaged in an emergency call.

In some embodiments, the mobility gateway may give communications to and from the first WCD priority over communications to and from the second WCD. Alternatively or additionally, the first wireless coverage area and the second wireless coverage area may cover two disjoint locations. Based on the first WCD being served by the first wireless coverage area, the mobility gateway may provide a given service to the first WCD, and based on the second WCD being served by the second wireless coverage area, the mobility gateway may prevent the second WCD from using the given service. The given service may be one of a voice service, a data service, and a short message service.

Additionally, the mobility gateway may receive a third authentication request from a third WCD that is served by the first wireless coverage area. Possibly in response to receiving the third authentication request, the mobility gateway may (i) attempt to communicate with the first subscriber database to remotely authenticate the third WCD, (ii) determine that the first subscriber database has not responded to the attempted communication, and (iii) locally authenticate the third WCD by determining that a third WCD identifier of the third WCD is present in the local database. The mobility gateway may also route network traffic between the local network point of presence and the third WCD.

Furthermore, the mobility gateway may establish telephony calls between the first and second WCDs based on a local dialing plan. The local dialing plan may allow the first WCD to call the second WCD using a local phone number of six digits or less. The mobility gateway may also route bearer traffic from telephony calls directly between the first and second WCDs and not via a wireless operator network. Moreover, routing network traffic between the local network point of presence and at least one of the first and second WCD may involve routing all network traffic to and from the first and second WCD through the mobility gateway and the common backhaul link.

8. Conclusion

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium such as a storage device including a disk or hard drive or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system comprising:
   at least one antenna configured to define a first wireless coverage area on a first carrier frequency and a second wireless coverage area on a second carrier frequency, wherein the first carrier frequency is associated with a first wireless operator and the second carrier frequency is associated with a second wireless operator; and
   a mobility gateway device, configured to (i) remotely authenticate wireless communication devices (WCDs) served by the first wireless coverage area by communicating with a first subscriber database of the first wireless operator, (ii) remotely authenticate WCDs served by the second wireless coverage area by communicating with a second subscriber database of the second wireless operator, and (iii) locally authenticate the remotely authenticated WCDs by determining that respective WCD identifiers for the remotely authenticated WCDs are present in a local database at the mobility gateway.

2. The system of claim 1, wherein all network traffic to and from WCDs served by the first wireless coverage area or the second wireless coverage area is routed through the mobility gateway and a common backhaul link.

3. The system of claim 1, further comprising:
   at least one local content server that stores local content, wherein the authenticated WCDs comprise a first set of WCDs and a second set of WCDs, and wherein the mobility gateway is further configured to (i) allow the first set of WCDs to access the local content, and (ii) prevent the second set of WCDs from accessing the local content.

4. The system of claim 1, wherein the authenticated WCDs comprise a first set of WCDs and a second set of WCDs, and wherein the mobility gateway is further configured to (i) allow the first set of WCDs to communicate via a network point of presence, and (ii) prevent the second set of WCDs from communicating via the network point of presence.

5. The system of claim 1, wherein the authenticated WCDs comprise a first set of WCDs and a second set of WCDs, and wherein the mobility gateway is further configured to give communications to and from WCDs of the first set of WCDs priority over communications to and from WCDs of the second set of WCDs.

6. The system of claim 1, wherein the at least one antenna includes a first antenna and a second antenna, wherein the first and second antennas provide wireless coverage in two disjoint locations, wherein the authenticated WCDs comprise a first WCD served by the first antenna and a second WCD served by the second antenna, and wherein the mobility gateway is configured to (i) based on the first WCD being served by the first antenna, provide a particular service to the first WCD, and (ii) based on the second WCD being served by the second antenna, prevent the second WCD from using the particular service.

7. The system of claim 6, wherein the particular service is chosen from the group consisting of a voice service, a data service, and a short message service.

8. The system of claim 1, wherein the mobility gateway is further configured to route network traffic between a network point of presence and an unauthenticated WCD, wherein the unauthenticated WCD is served by the first wireless coverage area or the second wireless coverage area, and wherein the unauthenticated WCD is engaged in an emergency call.

9. The system of claim 1, wherein the first wireless coverage area and the second wireless coverage area at least partially overlap.

10. The system of claim 1, wherein the authenticated WCDs comprise a first WCD and a second WCD, wherein the mobility gateway facilitates the first WCD and the second WCD placing telephony calls to one another according to a local dialing plan that uses local phone numbers of six digits or less.

11. The system of claim 10, wherein bearer traffic from the telephony calls made according to the local dialing plan does not traverse networks of the first wireless operator or the second wireless operator.

12. A method comprising:
   a mobility gateway receiving a first authentication request from a first wireless communication device (WCD), wherein the mobility gateway is in a local network, and wherein the first WCD is served by a first wireless coverage area that is defined using a first carrier frequency, wherein the first carrier frequency is associated with a first wireless operator;
   in response to receiving the first authentication request, (i) remotely authenticating the first WCD by communicating with a first subscriber database of the first wireless operator, and (ii) locally authenticating the first WCD by determining that a first WCD identifier of the first WCD is present in a local database at the mobility gateway;
   the mobility gateway receiving a second authentication request from a second WCD, wherein the second WCD is served by a second wireless coverage area that is defined using a second carrier frequency, wherein the second carrier frequency is associated with a second wireless operator; and
   in response to receiving the second authentication request, (i) remotely authenticating the second WCD by communicating with a second subscriber database of the second wireless operator, and (ii) locally authenticating the second WCD by determining that a second WCD identifier of the second WCD is present in the local database.

13. The method of claim 12, further comprising:
   the mobility gateway routing network traffic between a local network point of presence and either the first WCD or the second WCD, wherein the routing comprises:
   allowing the first WCD to communicate via the network point of presence; and
   preventing the second WCD from communicating via the network point of presence.

14. The method of claim 12, further comprising:
   allowing the first WCD to communicate with a local content server and preventing the second WCD from communicating with the local content server, wherein the local content server stores local content that is related to the local network.

15. The method of claim 12, further comprising:
   giving communications to and from the first WCD priority over communications to and from the second WCD.

16. The method of claim 12, wherein the first wireless coverage area and the second wireless coverage area cover two disjoint locations, the method further comprising:
   based on the first WCD being served by the first wireless coverage area, providing a particular service to the first WCD; and
   based on the second WCD being served by the second wireless coverage area, preventing the second WCD from using the particular service.

17. The method of claim 16, wherein the particular service is chosen from the group consisting of a voice service, a data service, and a short message service.

18. The method of claim 12, wherein the first and second wireless coverage areas at least partially overlap.

19. The method of claim 12, further comprising:
establishing telephony calls between the first and second WCDs based on a local dialing plan, wherein the local dialing plan allows the first WCD and the second WCD to call one another using local phone numbers of six digits or less.

20. An article of manufacture including a non-transitory computer-readable medium, having stored thereon program instructions that, upon execution by a computing device, cause the computing device to perform operations comprising:
receiving a first authentication request from a first wireless communication device (WCD), wherein the computing device is in a local network, and wherein the first WCD is served by a first wireless coverage area that is defined using a first carrier frequency, wherein the first carrier frequency is associated with a first wireless operator;
in response to receiving the first authentication request, (i) remotely authenticating the first WCD by communicating with a first subscriber database of the first wireless operator, and (ii) locally authenticating the first WCD by determining that a first WCD identifier of the first WCD is present in a local database at the computing device;
receiving a second authentication request from a second WCD, wherein the second WCD is served by a second wireless coverage area that is defined using a second carrier frequency, wherein the second carrier frequency is associated with a second wireless operator; and
in response to receiving the second authentication request, (i) remotely authenticating the second WCD by communicating with a second subscriber database of the second wireless operator, and (ii) locally authenticating the second WCD by determining that a second WCD identifier of the second WCD is present in the local database.

21. A system comprising:
at least one antenna configured to define a first wireless coverage area on a first carrier frequency and a second wireless coverage area on a second carrier frequency; and
a mobility gateway device, configured to (i) remotely authenticate wireless communication devices (WCDs) served by the first wireless coverage area by communicating with a first subscriber database of a first wireless operator, (ii) remotely authenticate WCDs served by the second wireless coverage area by communicating with a second subscriber database of a second wireless operator, and (iii) locally authenticate the remotely authenticated WCDs by determining that respective WCD identifiers for the remotely authenticated WCDs are present in a local database at the mobility gateway, wherein the authenticated WCDs comprise a first WCD and a second WCD, wherein the mobility gateway facilitates the first WCD and the second WCD placing telephony calls to one another according to a local dialing plan that uses local phone numbers of six digits or less, and wherein bearer traffic from the telephony calls made according to the local dialing plan does not traverse networks of the first wireless operator or the second wireless operator.

* * * * *